(12) United States Patent  
Huang et al.

(10) Patent No.: US 7,940,163 B2
(45) Date of Patent: May 10, 2011

(54) WIRELESS TIRE PRESSURE MONITORING SYSTEM

(75) Inventors: Shiao-Hwa Huang, Taichung (TW); Ming-Kaun Liao, Hsinchu County (TW); Yu-Chang Tsai, Taichung Hsien (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 328 days.

(21) Appl. No.: 12/332,142

(22) Filed: Dec. 10, 2008

(65) Prior Publication Data

US 2009/0179749 A1 Jul. 16, 2009

(30) Foreign Application Priority Data

Jan. 15, 2008 (TW) .............................. 97101573 A

(51) Int. Cl.
*B60R 25/10* (2006.01)
(52) U.S. Cl. .................... 340/426.33; 340/431; 340/445; 340/447; 340/539.13; 73/146.2
(58) Field of Classification Search ............ 340/426.33, 340/431, 442, 445, 447, 449, 539.1, 686.1, 340/539.13; 73/146, 146.2, 146.5
See application file for complete search history.

(56) References Cited

U.S. PATENT DOCUMENTS

| 6,246,316 | B1 * | 6/2001 | Andsager ..................... 340/444 |
| 6,880,395 | B2 * | 4/2005 | Norimatsu et al. .......... 73/146.4 |
| 6,927,679 | B2 * | 8/2005 | Taguchi et al. ............... 340/442 |
| 7,456,732 | B2 * | 11/2008 | Tranchina ..................... 340/447 |

* cited by examiner

*Primary Examiner* — Davetta W Goins
(74) *Attorney, Agent, or Firm* — Browdy and Neimark, PLLC

(57) ABSTRACT

A wireless tire pressure monitoring system includes a monitoring main unit installed in the truck-tractor of a towing vehicle, a receiving antenna electrically connected to the monitoring main unit, and a register set in a location within the wireless communication transmission range of the receiving antenna and stored with an ID code and location code of each sensor at each wheel of the platform of the towing vehicle. When the register receives a triggering signal containing an identification code of the monitoring main unit, the register compares and matches the identification code and the location code of every wheel of the platform with the identification code of the monitoring main unit and then sends matched data in the form of a wireless packet to the receiving antenna for enabling the monitoring main unit to recognize the installation location of every wheel of the platform of the towing vehicle.

11 Claims, 6 Drawing Sheets

WIRELESS TIRE PRESSURE MONITORING SYSTEM

BACKGROUND OF THE INVENTION

1. Field of the Invention

The present invention relates generally to tire pressure monitoring systems and more particularly, to a wireless tire pressure monitoring system for use in a towing vehicle.

2. Description of the Related Art

A wireless tire pressure monitoring system outputs measured tire pressure data of each vehicle wheel in the form of a packet by means of wireless communication transmission. The packet contains measured data of every vehicle wheel and the corresponding identification code. When the receiving antenna received this measured data and identification code, the monitoring main unit in the driver's cab identifies the wheel subject to the identification code so that the driver can monitor the tire pressure of every vehicle wheel. More particularly, the use of a wireless tire pressure monitoring system in a towing vehicle or the like where the wheels operate under a high load condition effectively monitors the tire pressure status of every wheel, maintaining the service life and assuring driving safety.

FIGS. 5 and 6 illustrate the arrangement of a wireless tire pressure monitoring system 1 in a towing vehicle 2 according to the prior art. As illustrated, the monitoring main unit 10 in the driver's cab at the truck-tractor 21 is electrically connected to a receiving antenna 12 at the bottom side of the platform 2, and a tire pressure sensor 13 is respectively installed in the air nozzle of each wheel 23 of the truck-tractor 21 and each wheel 24 of the platform 22. Each tire pressure sensor 13 sends the measured data in the form of a packet to the receiving antenna 12 wirelessly. When received one packet and processed out the contained data, the monitoring main unit 10 checks whether there is a built-in address data corresponding to the identification code in the contained data. When the identification code matched, the monitoring main unit 10 displays the tire pressure status of the corresponding wheel.

A towing vehicle usually carries a heavy load that contains a big number of articles. Before transportation, the load to be carried is loaded on the platform, and then the platform is coupled to a truck-tractor for carrying by the truck-tractor to the destination. When arrived at the destination, the platform with the load is disconnected from the truck-tractor, and then the truck-track is driven to transport another platform that has another load loaded thereon. When the aforesaid prior art wireless tire pressure monitoring system 1 is used in a towing vehicle and when the platform 22 is disconnected from the truck-tractor 21 and coupled with another platform, the monitoring main unit 10 needs to set the identification code of every wheel 24 of the newly attached platform 22 into corresponding specific address data so that the monitoring main unit 10 can identify the packet produced by the tire pressure sensor 13 at each wheel 24 of the newly attached platform 22 for accurate indication. In other words, each time the towing vehicle changes the platform, the wireless tire pressure monitoring system 1 completes the identification setting of every wheel of the newly attached platform before delivery of the load. This identification setting procedure is complicated. In case of a human error, the monitoring main unit will be unable to monitor all the wheels accurately, and any false indication upon an abnormality of the wheels may threaten the driving safety.

SUMMARY OF THE INVENTION

The present invention has been accomplished under the circumstances in view. It is the main object of the present invention to provide a wireless tire pressure monitoring system, which achieves identification setting of the wheels of the towing vehicle rapidly and accurately, improving tire pressure detection convenience and reliability.

To achieve this object of the present invention, the wireless tire pressure monitoring system is installed in a truck-tractor and a platform of a towing vehicle. The wireless tire pressure monitoring system comprises a monitoring main unit, a register and tire pressure sensors respectively installed in wheels of the towing vehicle. The monitoring main unit is installed in the truck-tractor of the towing vehicle and electrically connected to a receiving antenna. The register is set in a location within the wireless communication transmission range of the receiving antenna and stored with an identification code and a location code of each sensor installed in each wheel of the platform of the towing vehicle. When the register receives a triggering signal containing an identification code of the monitoring main unit, the register compares and matches the identification code and the location code of every wheel of the platform of the towing vehicle with the identification code of the monitoring main unit and then sends the matched data in the form of a wireless packet to the receiving antenna for data processing by the monitoring main unit to complete the address matching procedure of each sensor of each wheel of the platform of the towing vehicle. And then, the receiving antenna is arranged to a location within the wireless communication transmission range of each sensor of each wheel of the platform, such that the monitoring main unit can effectively receive and identify the packets sent by the tire pressure sensors of the wheels of the platform and indicate the operation status of each wheel of the platform during movement of the towing vehicle

BRIEF DESCRIPTION OF THE DRAWING

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
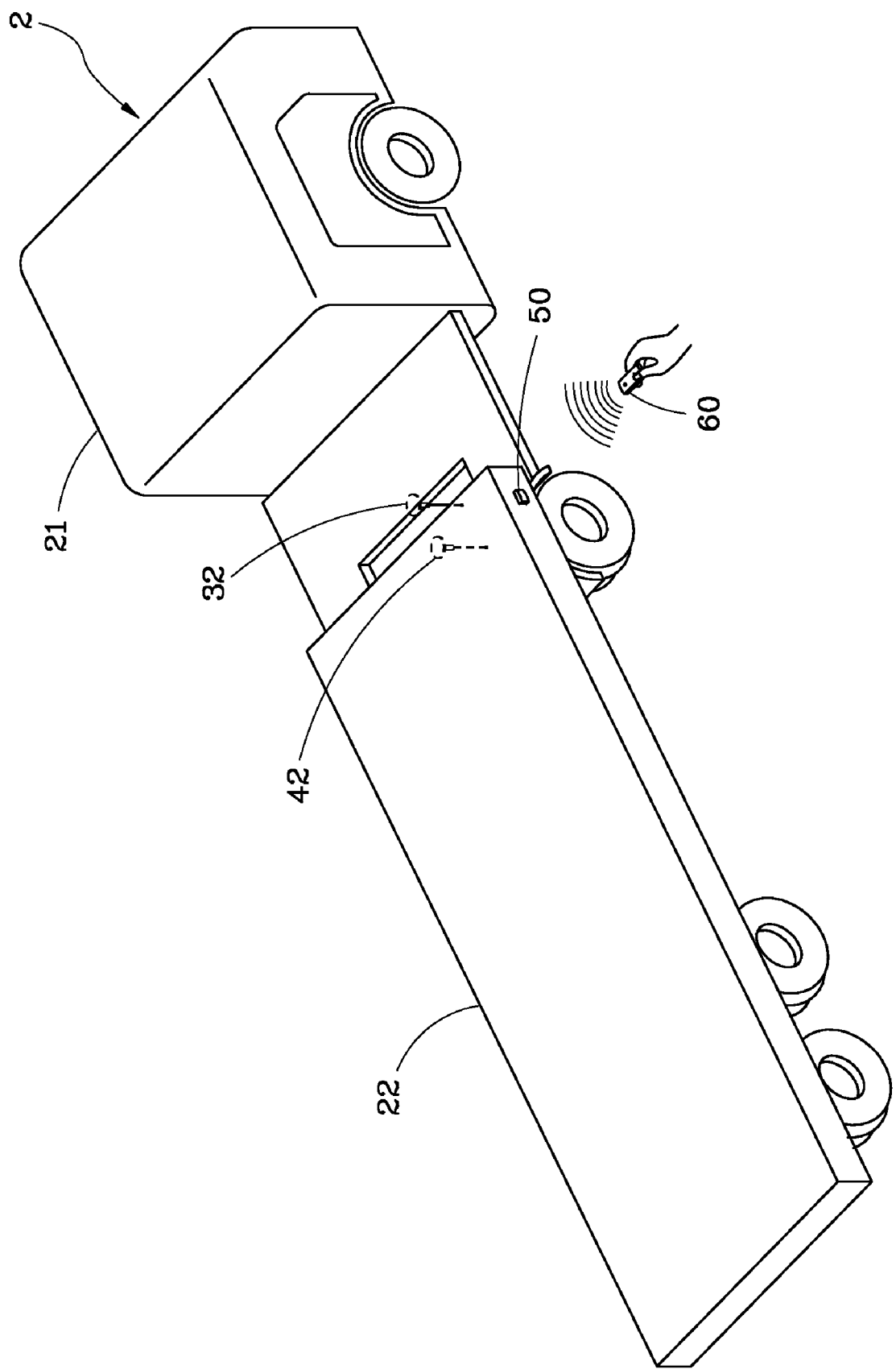
FIG. 1 is a schematic drawing showing an initial setting operation of a wireless tire pressure monitoring system installed in a towing vehicle in accordance with a preferred embodiment of the present invention.
Figure 2:
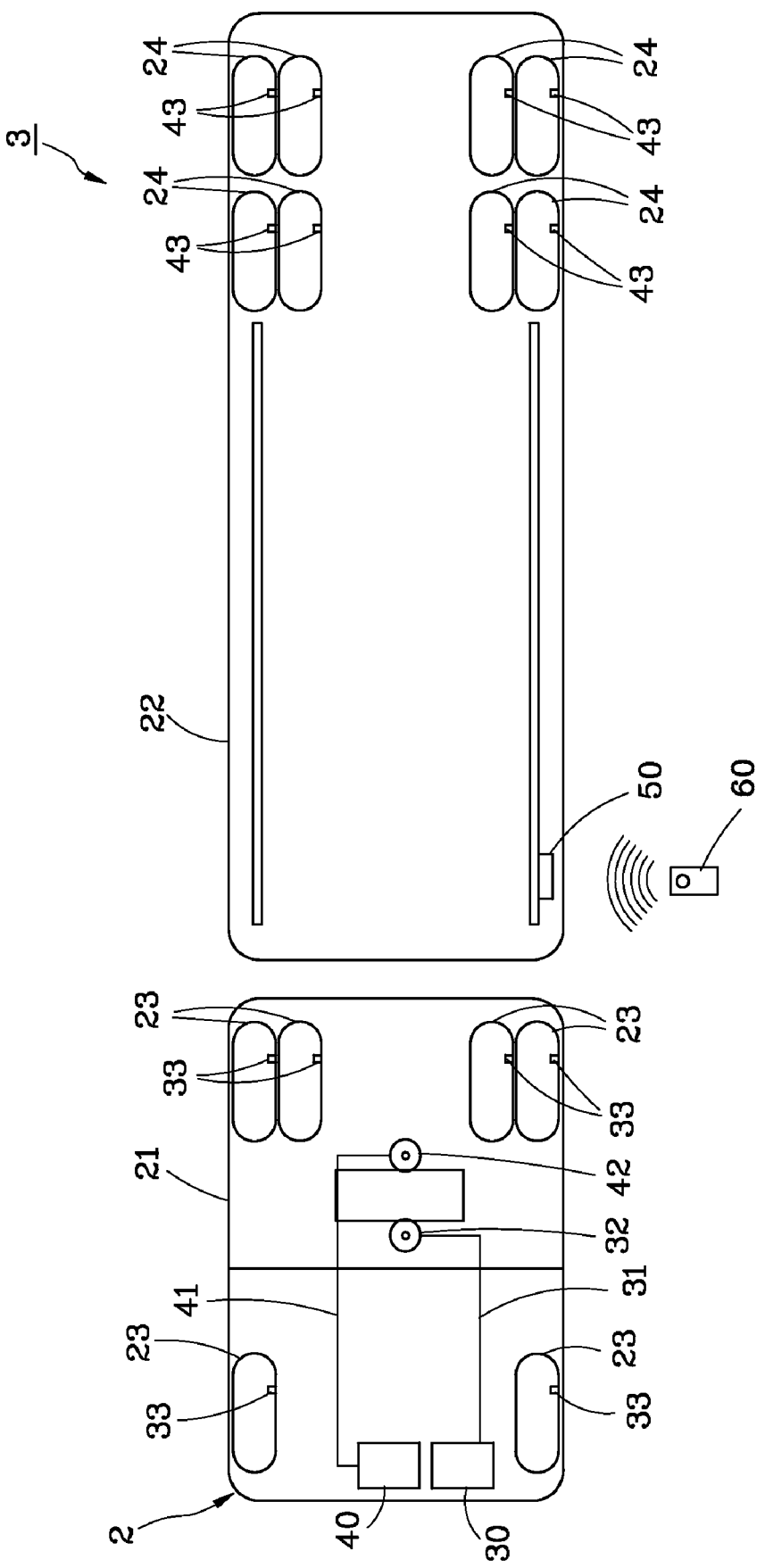
FIG. 2 is a schematic top plain view of the present invention, showing the initial setting operation of the wireless tire pressure monitoring system in the towing vehicle.

Referring to FIGS. 1 and 2, a wireless tire pressure monitoring system 3 is shown installed in a towing vehicle 2, comprising a truck-tractor monitoring main unit 30, a platform monitoring main unit 40, a truck-tractor receiving antenna 32, a platform receiving antenna 42, a register 50, a trigger 60, and a plurality of tire pressure sensors 33 and 43.

The two monitoring main units 30 and 40 are respectively installed in the driver's cab of the truck-tractor 21 of the towing vehicle 2.

The tire pressure sensors 33 and 43 are respectively installed in the wheels 23 and 24 of the truck-tractor 21 and platform 22 of the towing vehicle 2 to detect the tire pressure of the respective wheels 23 and 24 and to send out a respective packet wirelessly. Each produced packet contains the respective tire pressure data and the respective ID code.

The receiving antenna 32 and 42 are respectively and electrically connected to the monitoring main units 30 and 40 by respective transmission lines 31 and 41 for receiving the respective packets from the respective tire pressure sensors 33 and 43 at the truck-tractor 21 and platform 22 of the towing vehicle 2 during movement of the of the towing vehicle 2 so that the monitoring main units 30 and 40 display the respective operation status of the wheels 23 and 24 of the truck-tractor 21 and platform 22 of the towing vehicle 2.

The register 50 and the trigger 60 are communication setting members corresponding to the tire pressure sensors 43 at the platform 22 and the platform monitoring main unit 40. When the trigger 60 outputs a triggering signal, the register 50 starts to make a communication protocol with the platform monitoring main unit 40. This triggering signal is a specific ID code of the platform monitoring main unit 40. To let the register 50 identify the platform monitoring main unit 40, any method capable of imputing the ID code of the platform monitoring main unit 40 into the register 50 can be used. For example, the present preferred embodiment uses a low-frequency low-power remote controller to achieve the input at a short distance. According to this method, the communication frequency of the triggering signal is far beyond the high frequency communication band, and the short-distance induction range avoids interference of surrounding touch-control noises. The face panel of the register may provide buttons for manually inputting the ID code. This way can achieve the same function that the trigger 60 sending a triggering signal can do.

Figure 3:
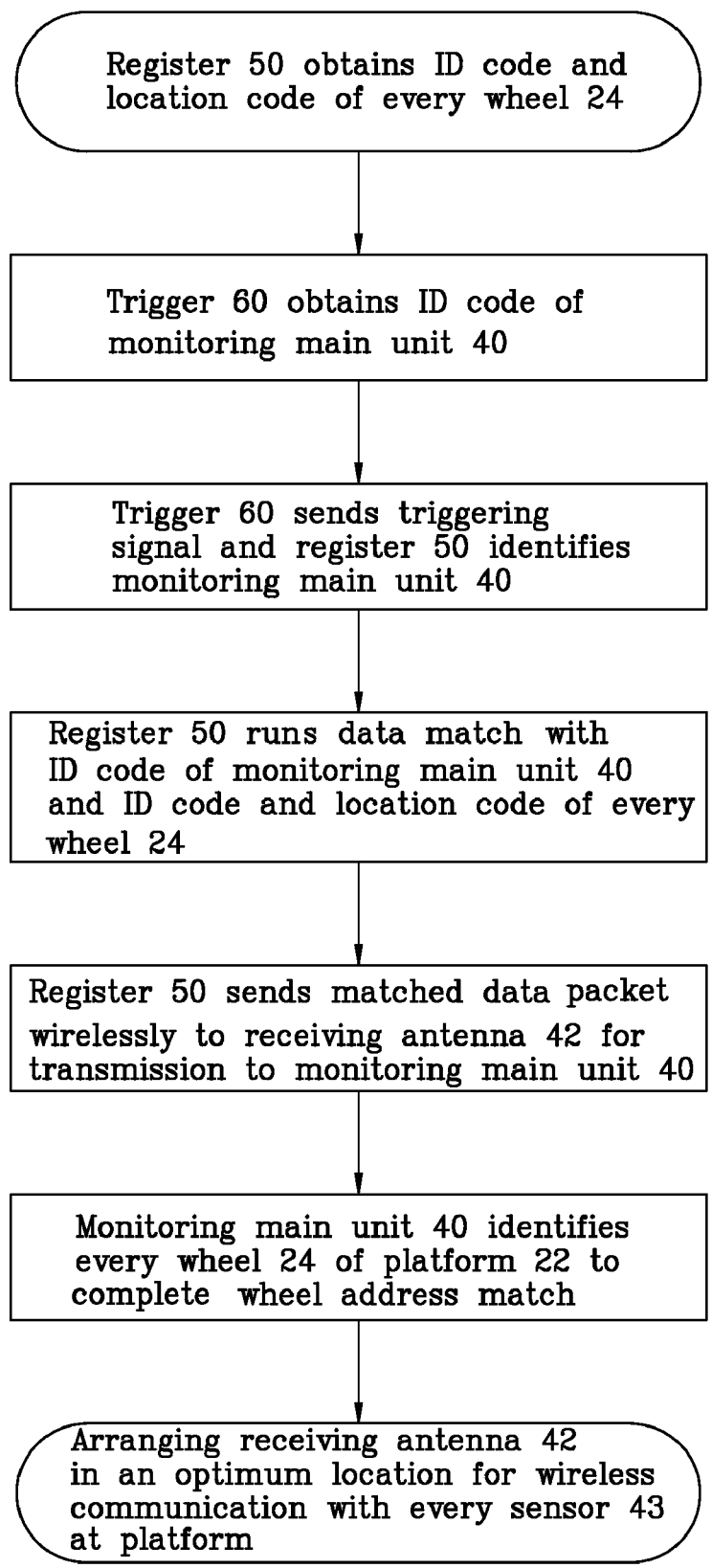
FIG. 3 is an operation flow chart showing the installation operation of the wireless tire pressure monitoring system in accordance with the preferred embodiment of the present invention.
Figure 4:
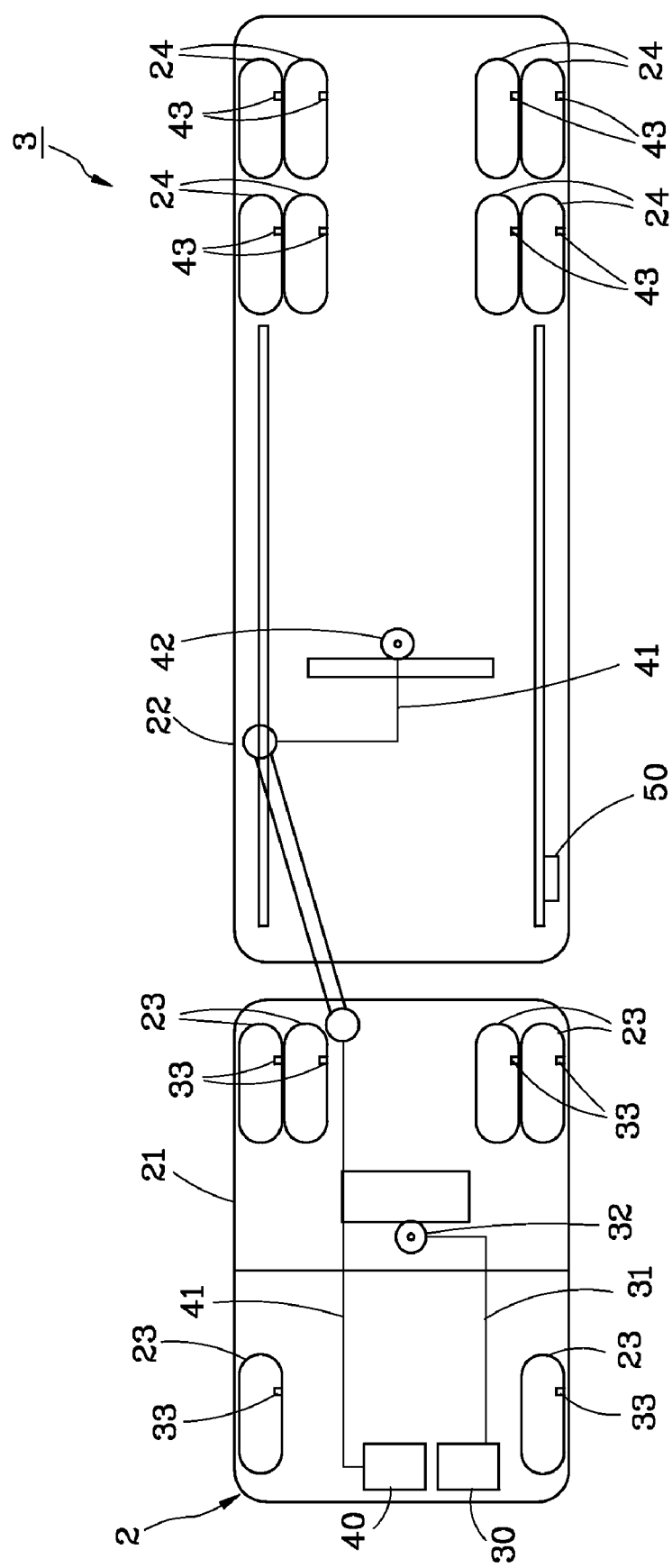
FIG. 4 is a schematic top plain view of the present invention, showing the status of the wireless tire pressure monitoring system in the towing vehicle after setting.
Figure 5:
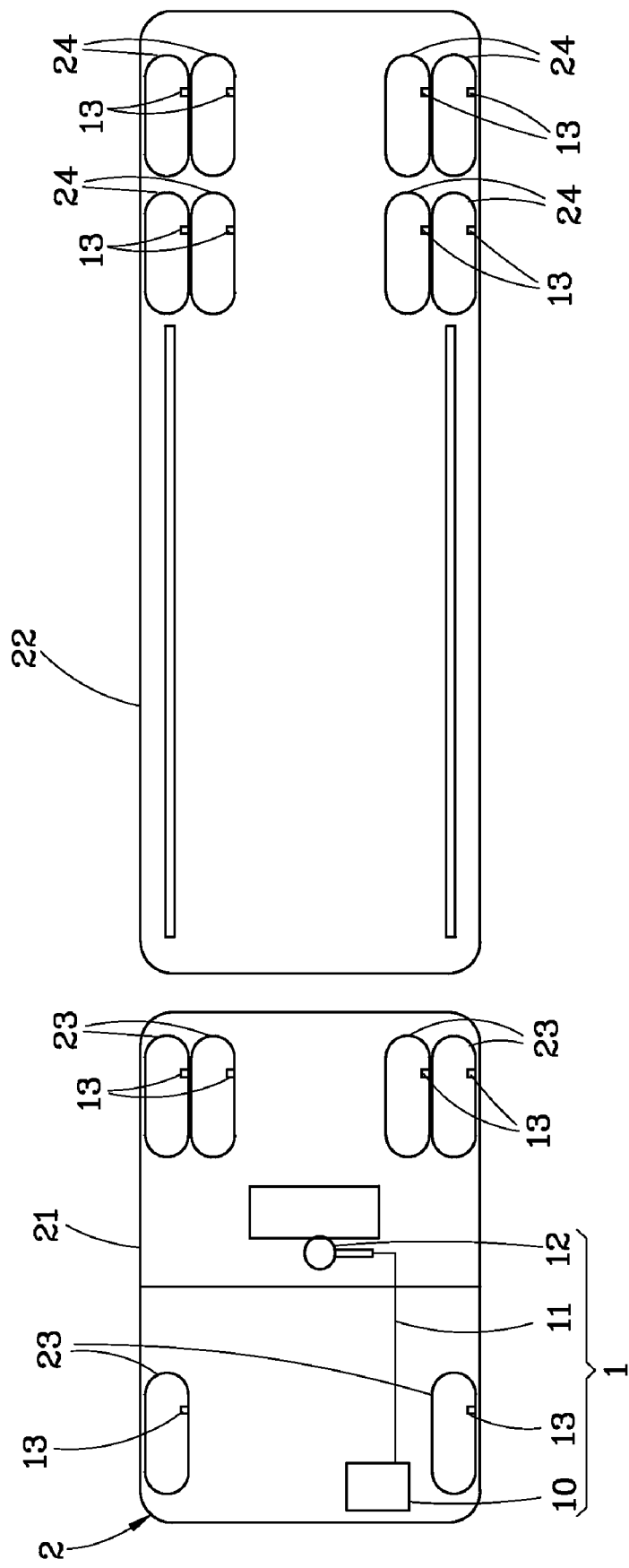
FIG. 5 is a schematic drawing showing the arrangement of a conventional wireless tire pressure monitoring system in a towing vehicle according to the prior art.
Figure 6:
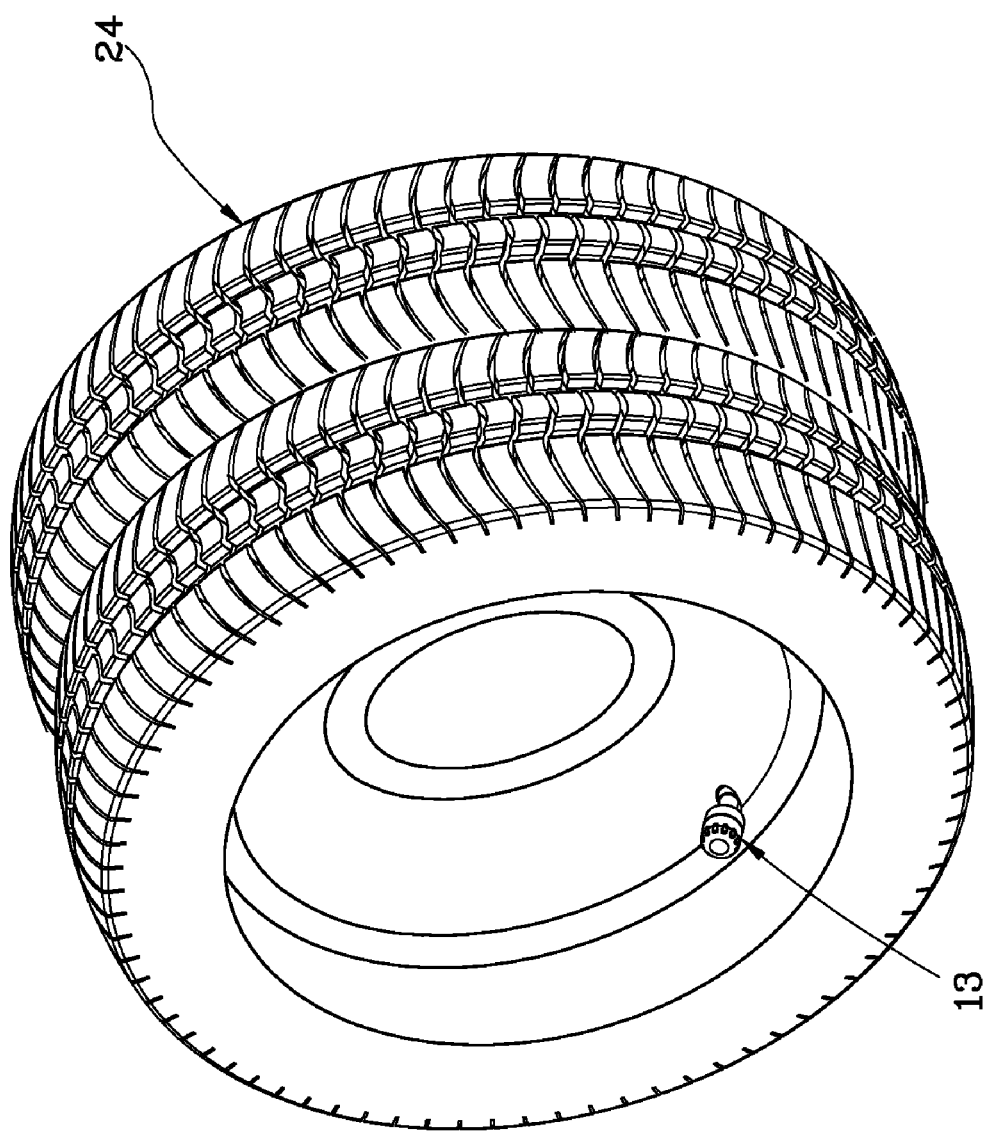
FIG. 6 is a schematic perspective drawing showing one tire pressure sensor installed in one wheel of the towing vehicle according to the prior art.

After coupling of the platform 22 to the truck-tractor 21 and before change of any tire pressure sensor 33 at any wheel 23 of the truck-tractor 21, the monitoring main unit 30 maintains the identification of every wheel 23 of the truck-tractor 21, and therefore the monitoring main unit 30 effectively identifies the packet received by the truck-tractor receiving antenna 32 from each tire pressure sensor 33. Further, when the platform 22 is changed, run the installation process shown in the flow chart of FIG. 3 for enabling the platform monitoring main unit 40 to recognize the tire pressure sensor 43 at each wheel 24 of the new platform 22. When the platform receiving antenna 42 is arranged to a location within the wireless communication transmission range of the tire pressure sensors 43, as shown in FIG. 4, the platform monitoring main unit 40 can then effectively identify the packets produced by the tire pressure sensors 43 and received by the platform receiving antenna 42 during movement of the towing vehicle 2.

The use of the wireless tire pressure monitoring system 3 in the towing vehicle 2 is described hereinafter.

a. Install the register 50 in a position within the wireless communication transmission range of the platform receiving antenna 42 and the effective operation range of the trigger 60, for example, install the register 50 in the lateral side at a front portion of the platform 22;

b. Make sure that the register 50 has stored therein the ID code and location code of every wheel 24 of the platform 22 and the trigger 60 has stored therein the ID code of the platform monitoring main unit 40;

c. The trigger 60 sends a triggering signal corresponding to the ID code of the platform monitoring main unit 40; and d. After receipt of the triggering signal, the register 50 matches the ID code and location code of the respective wheel 24 of the platform 22 with the ID code of the platform monitoring main unit 40 and then sends the matched data in the form of a packet to the platform receiving antenna 42, enabling platform monitoring main unit 40 to complete the address match of the respective tire pressure sensor 43 of the respective wheel 24, and the location recognition of every wheel 24 is done in the same manner.

Further, the wireless tire pressure monitoring system according to the present preferred embodiment has the register to be shifted following change of the platform. When the platform is changed, a triggering signal can be sent to the register through a single operation step to finish the location recognition between the platform monitoring main unit and the relative wheels of the platform. Therefore, the invention facilitates the setting between the register and the platform monitoring main unit. When the present invention is applied to a conventional monitoring system having only one single monitoring main unit and one single receiving antenna, the single monitoring main unit can be designed to have stored therein the location identification codes of the wheels of the truck-tractor, and the register can be operated to send the location identification code of every wheel of the platform to the single monitoring main unit through the single receiving antenna after change of the original platform, and therefore the single monitoring main unit can effectively receive and recognize the packets from the tire pressure sensors at the truck-tractor and platform through the receiving antenna during movement of the towing vehicle. Further, when an additional receiving antenna is installed in the platform to enhance the wireless communication signal receiving strength of the tire pressure sensors at the wheels of the platform and to have the monitoring main unit receive packets from the receiving antenna at the truck-tractor and the receiving antenna at the platform, the register can send the location identification code of every wheel at the platform to the single monitoring main unit through the platform receiving antenna, so that the single monitoring main unit can effectively receive and recognize the respective packets sent by the respective tire pressure sensors at the truck-tractor and platform through the truck-tractor receiving antenna and the platform receiving antenna during movement of the towing vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless tire pressure monitoring system for installation in a truck-tractor and a platform of a towing vehicle for recognizing locations of wheels of the towing vehicle for enabling a driver of the towing vehicle to monitor the status of every wheel of the towing vehicle, the wireless tire pressure monitoring system comprising:

a monitoring main unit installed in the truck-tractor of said towing vehicle;

a plurality of sensors respectively installed in the wheels of said towing vehicle to detect a tire pressure of the respective wheel and to wirelessly output a respective packet containing a tire pressure data and an identification code of the respective wheel;

a receiving antenna electrically connected to said monitoring main unit through a transmission line and capable of receiving the packet outputted by each said sensor for enabling said monitoring main unit to indicate an operation status of each wheel of the platform of said towing vehicle; and a register stored with an identification code and a location code of each said sensor installed in each wheel of the platform;

wherein when said register receives a triggering signal containing an identification code of said monitoring main unit, said register compares and matches the identification code and the location code of every wheel of the platform of said towing vehicle with the identification code of said monitoring main unit and then sends matched data in the form of a wireless packet to said receiving antenna for enabling said monitoring main unit to recognize the installation location of every wheel of the platform of said towing vehicle.

2. The wireless tire pressure monitoring system as claimed in claim 1, wherein when said register sends said wireless packet to said receiving antenna, said receiving antenna is located at the truck-tractor of said towing vehicle.

3. The wireless tire pressure monitoring system as claimed in claim 2, wherein after said register sends said wireless packet to said receiving antenna, said receiving antenna is moved to be located at the platform of said towing vehicle for receiving the packets from the sensors installed in the wheels of the platform of said towing vehicle.

4. The wireless tire pressure monitoring system as claimed in claim 3, further comprising a truck-tractor receiving antenna mounted to the truck-tractor of said towing vehicle for receiving the packets from the sensors installed in the wheels of the truck-tractor of said towing vehicle.

5. The wireless tire pressure monitoring system as claimed in claim 4, wherein said truck-tractor receiving antenna is electrically connected to a truck-tractor monitoring main unit through a transmission line so that said truck-tractor monitoring main unit indicates the operation status of every wheel of the truck-tractor of said towing vehicle.

6. The wireless tire pressure monitoring system as claimed in claim 4, wherein said receiving antenna and said truck-tractor receiving antenna are electrically connected to said monitoring main unit such that said monitoring main unit indicates the operation status of every wheel of the truck-tractor and the platform of said towing vehicle.

7. The wireless tire pressure monitoring system as claimed in claim 1, further comprising a trigger stored with the identification code of said monitoring main unit, and said triggering signal received by said register is sent by said trigger.

8. A wireless tire pressure monitoring system installation procedure of the wireless tire pressure monitoring system of claim 1, comprising the steps of:

installing said register on a location of said towing vehicle within an effective wireless communication transmission range of said receiving antenna;

sending the triggering signal containing the identification code of said monitoring main unit to said register; and arranging said receiving antenna to a location of said towing vehicle within an effective wireless communication transmission range of the sensors at the wheels of the platform of said towing vehicle.

9. The wireless tire pressure monitoring system installation procedure as claimed in claim 8, wherein said triggering signal is sent by a trigger that is stored with the identification code of said monitoring main unit and can output said triggering signal wirelessly.

10. The wireless tire pressure monitoring system installation procedure as claimed in claim 9, wherein a wireless communication frequency range of said triggering signal sent by said trigger is smaller than a wireless communication frequency range of said receiving antenna.

11. The wireless tire pressure monitoring system installation procedure as claimed in claim 8, wherein said triggering signal is directly sent to said register through buttons on a face panel at said register.

\* \* \* \* \*